United States Patent
Toda

[11] Patent Number: 5,975,655
[45] Date of Patent: Nov. 2, 1999

[54] HYDRAULIC BRAKING PRESSURE CONTROL SYSTEM FOR AN AUTOMOTIVE VEHICLE

[75] Inventor: Hiroshi Toda, Kariya, Japan

[73] Assignee: Aisin Seiki Kabushiki Kaisha, Kariya, Japan

[21] Appl. No.: 08/870,823

[22] Filed: Jun. 6, 1997

[51] Int. Cl.⁶ ........................................................ B60T 8/36
[52] U.S. Cl. ............................................ 303/119.2; 188/352
[58] Field of Search ............................ 303/116.1, 116.2, 303/119.1, 119.2; 188/352

[56] References Cited

U.S. PATENT DOCUMENTS

| | | | |
|---|---|---|---|
| 5,472,268 | 12/1995 | Ando et al. | 303/116.2 |
| 5,505,529 | 4/1996 | Siegel et al. | 303/116.2 |
| 5,538,335 | 7/1996 | Saito et al. | 303/116.4 |
| 5,605,384 | 2/1997 | Johnston et al. | 303/119.1 |

*Primary Examiner*—Robert J. Oberleitner
*Assistant Examiner*—Thomas J. Williams
*Attorney, Agent, or Firm*—Burns, Doane, Swecker & Mathis, LLP

[57] ABSTRACT

A hydraulic brake pressure control system for an automotive vehicle has a primary pressure control circuit including a connecting line for connecting a master cylinder and a wheel brake cylinder. A reservoir holds brake fluid and is connected to a reservoir circuit. A first solenoid valve is disposed in the primary pressure control circuit for selectively closing the connecting line. A second solenoid valve is disposed for selectively connecting a portion of the connecting line between the first solenoid valve and the wheel brake cylinder with the reservoir circuit. The second solenoid valve opens in response to a pressure difference between the primary pressure control circuit and the reservoir circuit when the primary pressure control circuit is evacuated during the initial filling of brake-fluid into the system.

14 Claims, 3 Drawing Sheets

HYDRAULIC BRAKING PRESSURE CONTROL SYSTEM FOR AN AUTOMOTIVE VEHICLE

FIELD OF THE INVENTION

The present invention generally relates to brake systems. More particularly, the present invention concerns a hydraulic brake pressure control system for an automotive vehicle employing hydraulic pressure balanced solenoid valves.

BACKGROUND OF THE INVENTION

U.S. Pat. No. 5,505,529 discloses a hydraulic brake pressure control system which has a check valve to evacuate air in the fluid circuits. This hydraulic brake system includes a first solenoid valve which selectively closes the fluid line between the master cylinder and the wheel brake and a second solenoid valve which selectively connects the fluid line extending between the first solenoid valve and the wheel brake with the reservoir circuit. The brake fluid flows from the main brake circuit into the reservoir circuit through the second solenoid valve. The system further includes a pump to return the brake fluid in the reservoir circuit back to the fluid line extending between the master cylinder and the first solenoid valve.

After assembling the hydraulic brake system, a vacuum pump is connected to the reservoir of the master cylinder to evacuate the brake system. Then the main brake circuit and the reservoir circuit are filled with brake fluid. In this brake system, a one-way valve is provided between the reservoir circuit and the main brake circuit so that air in the reservoir circuit can be evacuated to the main brake circuit without opening the second solenoid valve. The one-way valve is a gravity type valve which opens when gravity is applied to the valve. This one-way valve makes it unnecessary to open the solenoid valves electrically when evacuating air in the brake system.

However, the above mentioned brake system suffers from the disadvantage that it requires a special valve such as a one-way valve. This increases the complexity and number of parts of the system, and makes the system more expensive.

SUMMARY OF THE INVENTION

In light of the foregoing, a need exists for an improved hydraulic brake pressure control system that is not susceptible to the above-mentioned disadvantages and drawbacks.

It would be desirable, therefore, to provide a hydraulic pressure control system which can evacuate air in the reservoir circuit, yet which does not require an increase in the number of parts.

To address the aforementioned disadvantages and drawbacks, the hydraulic brake pressure control system for an automotive vehicle in accordance with the present invention has respective wheel brake cylinders operatively connected to front and rear road wheels for applying a braking force and a master cylinder for supplying hydraulic brake pressure. The brake system has a primary pressure control circuit including a connecting line for connecting the master cylinder and the wheel brake cylinders, and a first solenoid valve is disposed in the primary pressure control circuit for selectively closing the connecting line. The brake-system further includes a reservoir circuit including a reservoir, a second solenoid valve for selectively connecting a portion of the connecting line between the first solenoid valve and the wheel brake cylinder with the reservoir circuit, and a pump for returning brake fluid in the reservoir to a portion of the connecting line between the master cylinder and the first solenoid valve. The second solenoid valve opens in response to a pressure differential between the primary pressure control circuit and the reservoir circuit when the primary pressure control circuit is evacuated for the initial filling of brake fluid.

According to another aspect of the invention, a hydraulic brake pressure control system for an automotive vehicle includes a wheel brake cylinder that is connectable to a road wheel for applying a braking force, a master cylinder for supplying hydraulic brake pressure, a hydraulic connecting line communicating the master cylinder and the wheel brake cylinder, and a first solenoid valve disposed in the hydraulic connecting line for selectively closing the connecting line. A reservoir is provided for holding brake fluid and a reservoir circuit communicates with the reservoir. A pressure operated second solenoid valve is connected to the connecting line and the reservoir circuit for selectively communicating a portion of the connecting line between the first solenoid valve and the wheel brake cylinder with the reservoir circuit. The second solenoid valve is designed to be opened when a pressure differential exists between the pressure in the connecting line and the pressure in the reservoir circuit. A pump communicates with the reservoir for returning brake fluid in the reservoir to a portion of the connecting line between the master cylinder and the first solenoid valve.

BRIEF DESCRIPTION OF THE DRAWING FIGURES

The foregoing and additional features associated with the present invention will be better understood from the detailed description set forth below considered in conjunction with the drawing figures in which like elements are designated by like reference numerals and wherein.

DETAILED DESCRIPTION OF A PREFERRED EMBODIMENT

Figure 1:
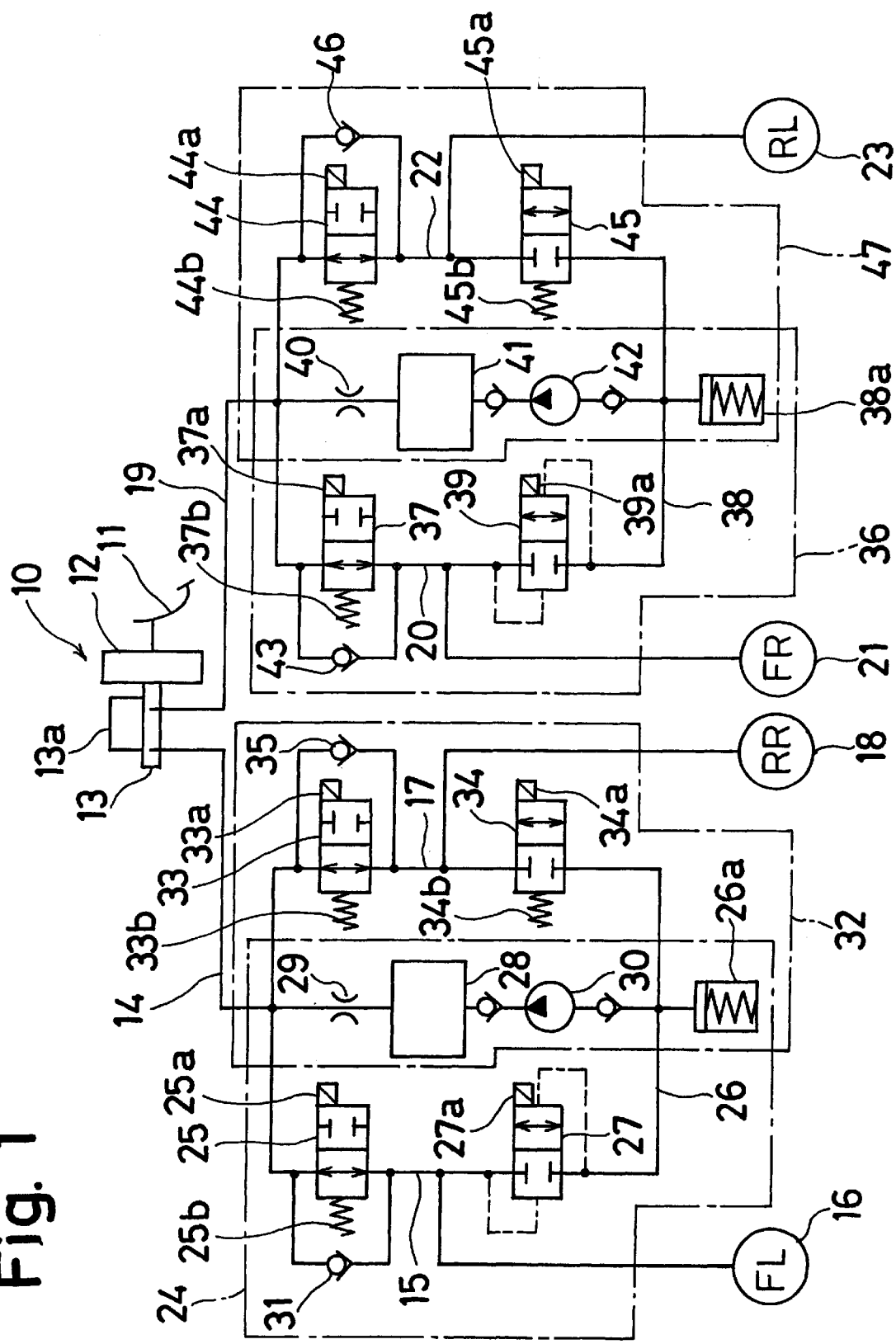
FIG. 1 is a schematic block diagram of a hydraulic brake pressure control system according to the present invention.

An embodiment of the brake pressure control system according to the present invention is illustrated in FIG. 1. Referring to FIG. 1, the system includes a hydraulic pressure generator 10 and a pair of reservoirs 26a, 38a connected to the hydraulic pressure generator 10 by respective hydraulic lines 14, 19. A pump 30, 42 is disposed in each respective hydraulic line 14, 19. Additional hydraulic lines 15, 17, 20, 22 provide communication between the hydraulic pressure generator 10 and the respective wheel brake cylinders 16, 18, 21, 23 operatively connected to the road wheels. In addition, various solenoid valves 25, 27, 33, 34, 37, 39, 44, 45 are disposed in hydraulic lines 14, 15, 17, 19, 20, 22 connected to a hydraulic pressure generator 10. The road wheel FR designates the front right side wheel as viewed from the driver's seat, the road wheel FL designates the front left side wheel, the road wheel RR designates the wheel on the rear right side of the vehicle and the road wheel RL designates the road wheel at the rear left side of the vehicle.

The hydraulic pressure generator 10 includes a booster 12, a master cylinder 13 and a reservoir 13a. The hydraulic pressure generator 10 operates in response to the depression of a brake pedal 11.

Between the hydraulic pressure generator 10 and the wheel brake cylinders 16, 18, 21 23, there is disposed a plurality of actuator circuits 24, 32, 36, 47 and reservoir circuits 26, 38. The actuator circuit 24 operates for controlling brake pressure in the wheel brake cylinder 16 operatively connected to the front left road wheel FL, the actuator circuit 32 operates for controlling brake pressure in the brake cylinder 18 operatively connected to the right rear road wheel RR, the actuator circuit 36 operates for controlling brake pressure in the brake cylinder 21 operatively connected to the front right road wheel FR, and the actuator circuit 47 operates for controlling brake pressure in the brake cylinder 23 operatively connected to the rear left road wheel RL.

A plurality of solenoid valves 25, 27, 33, 34 are disposed respectively in the hydraulic circuits 24, 26, 32 for connecting one output port of the master cylinder 13 to the wheel brake cylinders 16, 18. The pump 30 is disposed between the master cylinder 13 and the solenoid valves 27, 34.

A plurality of solenoid valves 37, 39, 44, 45 are also disposed respectively in the hydraulic circuits 36, 38, 47 for connecting the other output port of the master cylinder 13 to the wheel brake cylinders 21, 23. The pump 42 is disposed between the master cylinder 13 and the solenoid valves 39, 45. The pumps 30, 42 are driven by an electric motor (not shown) so that brake fluid raised to a predetermined pressure is supplied to the hydraulic circuits. Accordingly, the hydraulic circuits serve as the circuits through which the hydraulic brake pressure is supplied to the normally open solenoid valves 25, 33, 37, 44. The normally open solenoid valves 25, 33, 37, 44 constitute first solenoid valves.

Various check valves 31, 35, 43, 46 are also arranged between the input port and output port of the solenoid valves 25, 33, 37, 44. These check valves 31, 35, 43, 46 permit brake fluid to return from each of the wheel brake cylinders 16, 18, 21, 23 and the reservoirs 26a, 38a to the hydraulic pressure generator 10. At the same time, the check valves 31, 35, 43, 46 block the counter flow of brake fluid in the opposite directions.

The hydraulic circuits at the drain side of the normally closed solenoid valves 27, 34 are connected to the pump 30 and the reservoir 26a. The hydraulic circuits at the drain side of the normally closed solenoid valves 39, 45 are connected to the pump 42 and the reservoir 38a.

Each of the solenoid valves 25, 27, 33, 34, 37, 39, 44, 45 has a solenoid coil 25a, 27a, 33a, 34a, 37a, 39a, 44a, 45a, respectively. The solenoid valves 25, 33, 37, 44 each have a respective spring 25b, 33b, 37b, 44b to maintain the solenoid valves in the open position when each of the solenoid valves is not energized. Similarly, the solenoid valves 34, 45 each have a respective spring 34b, 45b that maintains the solenoid valves in the closed position when each of the solenoid valves is not energized.

The solenoid valves 27, 39, which constitute second solenoid valves, do not have springs. In the non-energized condition, the closed position of the second solenoid valves 27, 39 is controlled in accordance with the brake fluid pressure balance between the input port and output port of the solenoid valves 27, 39. The structure and operation of the normally closed solenoid valves 27, 39 will described below in more detail.

Each of the reservoirs 26a, 38a is provided with a piston and a spring. The reservoirs 26a, 38a are designed to store brake fluid returned from each of the solenoid valves 27, 34, 39, 45 through the hydraulic circuits at the drain side thereof and to supply brake fluid to each of those solenoid valves when the pumps 30, 42 are in operation.

A plurality of check valves each positioned on the inlet and outlets ends of the pumps 30, 42, a plurality of dampers 28, 41, and a plurality of orifice valves 29, 40 are arranged between the reservoirs 26a, 38a and the hydraulic pressure generator 10.

Each of the solenoid valves 25, 27, 33, 34, 37, 39, 44, 45 is a two-port, solenoid operated, changeover valve. In the first operating position shown in FIG. 1 in which current is not supplied to the solenoid coil, each of the wheel brake cylinders 16, 18, 21, 23 is communicated with the hydraulic pressure generator 10. When current is supplied to the solenoid coil of the respective solenoid valves 25, 27, 33, 34, 37, 39, 44, 45, each solenoid valve is changed over to a second operating position so that each of the wheel cylinders 16, 18, 21, 23 is cut off from communication with the hydraulic pressure generator 10. According to the operation of the solenoid valves, each of the wheel cylinders 16, 18, 21, 23 is communicated with the reservoir 26a, 38a.

Depending upon whether each of the solenoid valves 25, 27, 33, 34, 37, 39, 44, 45 is energized or not, the hydraulic wheel braking pressure in each of the wheel brake cylinders 16, 18, 21, 23 is decreased, held or increased. Namely, when current is not supplied to the solenoid coils 25a, 27a, 33a, 34a, 37a, 39a, 44a, 45a of each of the solenoid valves 25, 27, 33, 34, 37, 39, 44, 45, the hydraulic brake pressure is supplied from the hydraulic pressure generator 10 and the pump 30 or 42 to each of the wheel brake cylinders 16, 18, 21, 23 to increase the hydraulic brake pressure in each wheel brake cylinder. On the other hand, when current is supplied to the solenoid coil, each of the wheel brake cylinders 16, 18, 21, 23 is communicated with the respective reservoir 26a, 38a to decrease the hydraulic baking pressure in each wheel brake cylinder. When current is supplied only to the solenoid coils 25, 33, 37, 44, the hydraulic brake pressure in each wheel brake cylinder is held.

Figure 2:
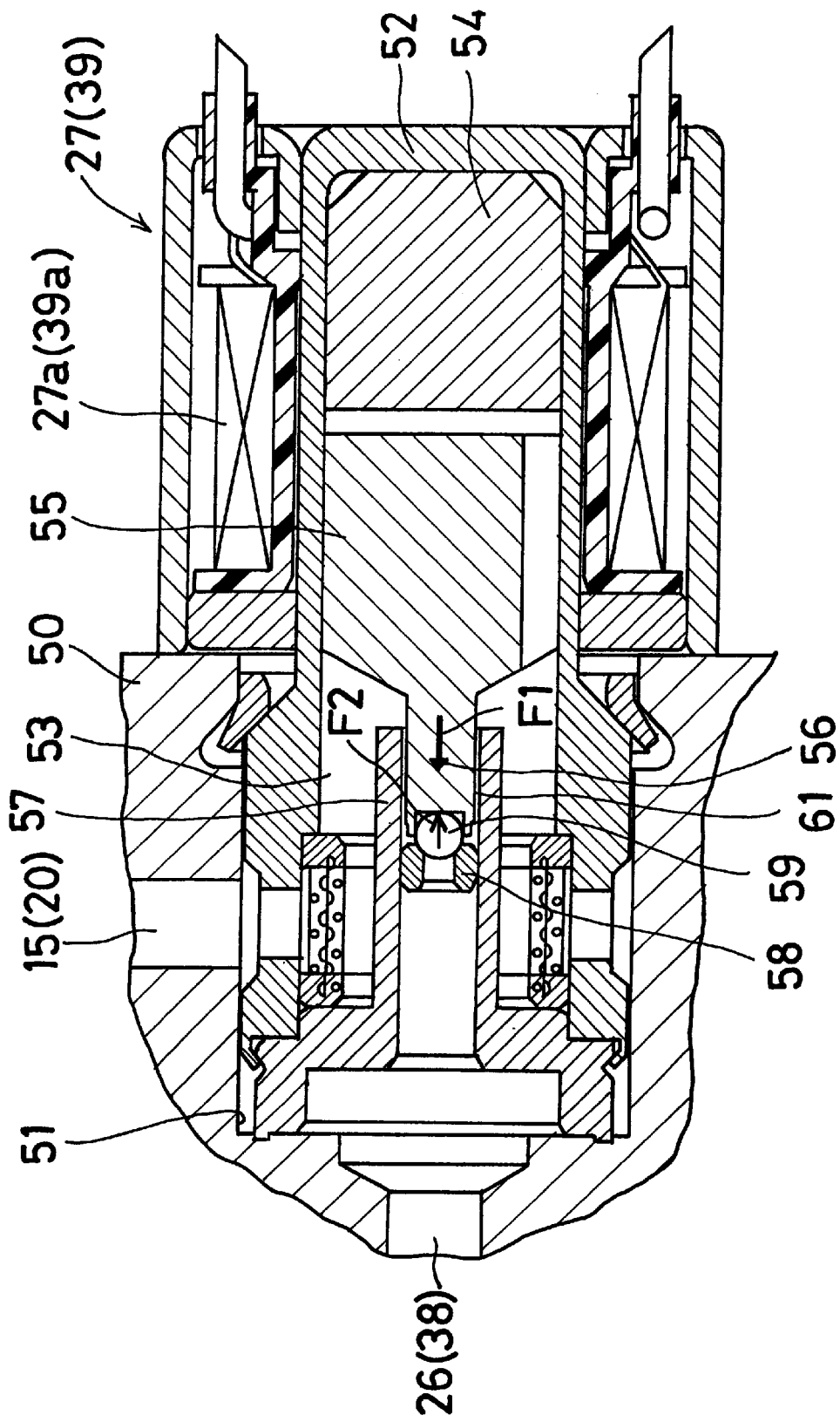
FIG. 2 is a cross sectional view of a solenoid valve in accordance with the present invention when the solenoid valve is not energized.
Figure 3:
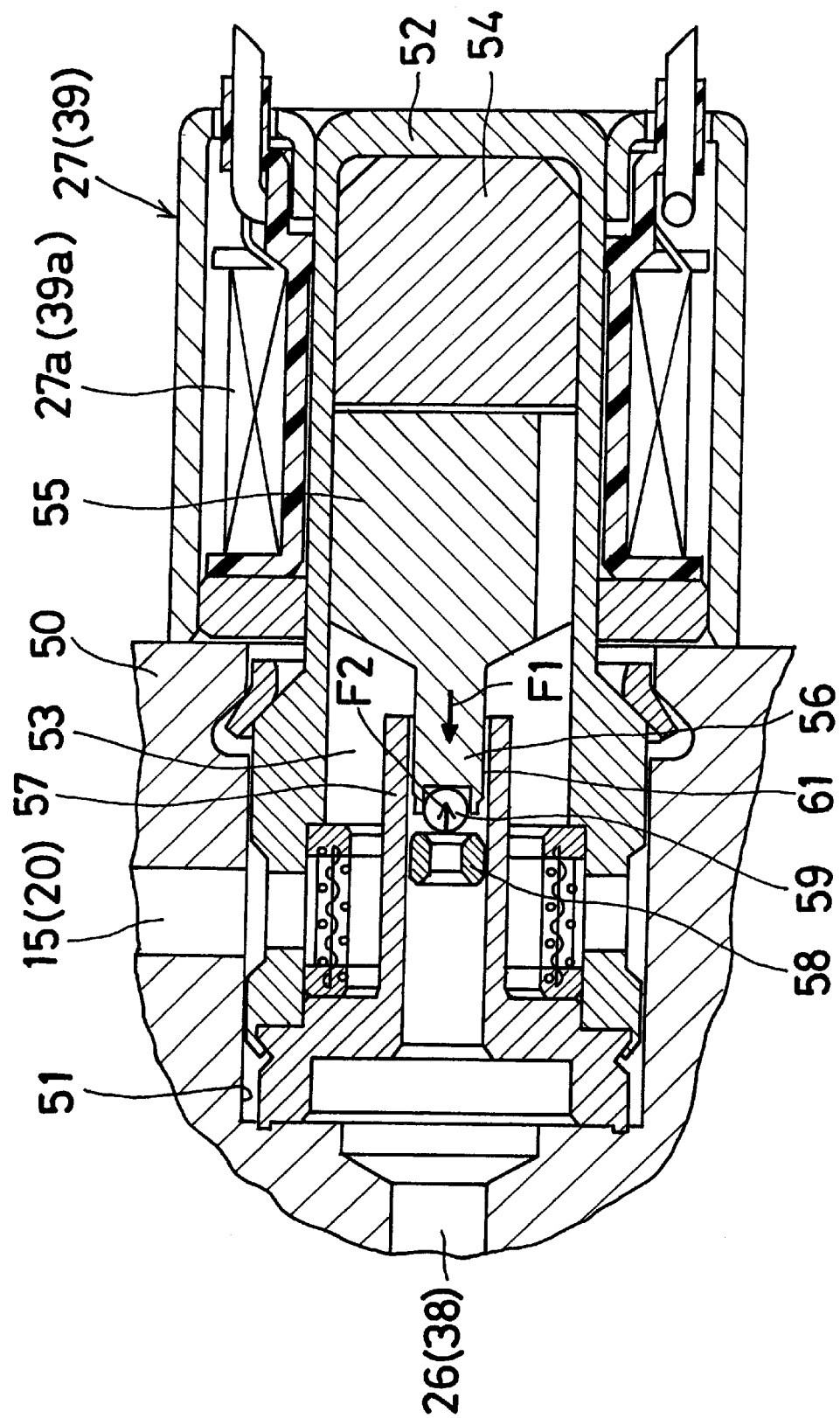
FIG. 3 is a cross sectional view of a solenoid valve in accordance with the present invention when the solenoid valve is energized.

FIG. 2 and FIG. 3 illustrate the details associated the two second solenoid valves 27, 39. FIG. 2 depicts the solenoid valves 27, 39 in the closed position while FIG. 3 illustrates the open position of the solenoid valves 27, 39. The hydraulic line 15 (20), which communicates with the hydraulic pressure generator 10, and the reservoir circuit 26 (38), which communicates with the reservoir 26a (38a), are formed in a body. Also formed in the body 50 is a hole or recessed area 51.

The solenoid valve 27 (39) includes a case 52 that is made of non-magnetic material and tightly fixed to the hole 51. The case 52 forms a chamber 53. A movable plunger 55 is slidably arranged in the inner portion of the case 52 and a fixed core 54 is tightly fixed to the inner portion of the case 52. A projecting portion 56 is formed at the left side of the plunger 55. A sleeve 57 is fixed to the hole 51 and the case 52. The projecting portion 56 is located in an opening formed at an end portion of the sleeve 57. A valve body 59 is also arranged at the tip portion of the projection 56 and a valve seat 58 is fixed to the inner portion of the sleeve 57. The valve body 59 is designed to engage the valve seat 58 to close the valve 27 (39). The solenoid coil 27a (39a) is positioned at the circumferential portion of the case 52. An annular or ring-shaped path 61 is provided between the projection 56 and the sleeve 57 to allow brake fluid flow.

To initially fill brake fluid in the circuit during the manufacturing process of the vehicle, a vacuum pump (not shown) is connected to the reservoir 13a to evacuate air from the actuator circuits 24, 32, 36, 47 and the reservoir circuits 26, 38. At first, the vacuum pump evacuates air in the hydraulic lines 14, 15, 17, 19, 20, 22 which constitute primary pressure control circuits. The pressure in each of the hydraulic lines 14, 15, 17, 19, 20, 22 falls below the pressure in the hydraulic lines 26, 38, which constitute secondary pressure control circuits. Based on this pressure differential between the inlet and outlet of the solenoid valves 27, 39, the solenoid valves 27, 39 are rendered operational and move to the open position so that the air in the reservoir circuits 26, 38 can be evacuated. After evacuating the air in the reservoir circuits 26, 38, the fluid paths 14, 15, 17, 19, 20, 22 and the wheel brake cylinders 16, 18, 21, 23 are filled with brake fluid. In this condition, the solenoid valves 27, 39 operate to the closed position because the pressure in the fluid paths 14, 15, 17, 19, 20, 22 keeps the pressure higher than in the reservoir circuits 26, 38. The pressure level in the reservoir circuits stays at a negative pressure level until each of the solenoid valves 27, 39 is energized. When the solenoid valves 27, 39 and/or 34, 45 are energized, the reservoir circuits are filled with brake fluid.

When the pressure in the fluid path 15 is higher than the pressure in the reservoir circuit 26, brake fluid flows into the reservoir circuit 26 through the chamber 53, the annular or ring-shaped path 61, and the opening between the valve seat 58 and the valve body 59. The annular or ring-shaped path 61 declines or reduces the fluid pressure by using the brake fluid viscosity. The value of the fluid pressure reduction or decline rises in proportion to the length of the ring shaped path 61. On the other hand, the fluid pressure reduction value is inversely proportional to the third power of the gap between the ring-shaped path 61 and the projection 56. An operating force "F1" occurs based on the pressure differential between the chamber and the reservoir circuit 26 when current is not supplied to the solenoid valve 27. The value of the operating force "F1" is calculated according to the product of the pressure difference and the area of the cross section of the projection 56.

When the pressure in the fluid path 15 is smaller than that of the reservoir circuit 26, the operating force "F2" occurs based on the pressure differential between the chamber and the reservoir circuit 26. The value of the operating force "F2" is calculated according to the product of the pressure difference and the area of the effective sealing area of the valve seat portion.

The principles, a preferred embodiment and the mode of operation of the present invention have been described in the foregoing specification. However, the invention which is intended to be protected is not to be construed as limited to the particular embodiments described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A hydraulic brake pressure control system for an automotive vehicle comprising:

wheel brake cylinders operatively connectable to respective front and rear road wheels for applying a braking force;

a master cylinder for supplying hydraulic brake pressure;

a primary pressure control circuit including a connecting line for connecting said master cylinder and said wheel brake cylinders;

a first solenoid valve disposed in said primary pressure control circuit for selectively closing said connecting line;

a reservoir for holding brake fluid;

a reservoir circuit connected to the reservoir;

a second solenoid valve for selectively connecting a portion of said connecting line between said first solenoid valve and said wheel brake cylinder with said reservoir circuit; and a pump for returning brake fluid in said reservoir to a portion of said connecting line between said master cylinder and said first solenoid valve;

said second solenoid valve opening in response to a pressure differential between said primary pressure control circuit and said reservoir circuit when said primary pressure control circuit is evacuated for effecting an initial filling of brake fluid.

2. A hydraulic brake pressure control system for an automotive vehicle as set forth in claim 1, wherein said second solenoid valve opens in response to a hydraulic braking pressure differential between said primary pressure control circuit and said reservoir circuit when said second solenoid is not energized.

3. A hydraulic brake pressure control system for an automotive vehicle as set forth in claim 2, wherein said second solenoid valve includes a movable plunger, a sleeve and a fluid path disposed between said primary pressure control circuit and said reservoir circuit.

4. A hydraulic brake pressure control system for an automotive vehicle as set forth in claim 1, wherein said second solenoid valve includes a body provided with a hole that communicates with the reservoir circuit, a case fitted within the hole and a chamber defined within the case, said chamber being in communication with the connecting line.

5. A hydraulic brake pressure control system for an automotive vehicle as set forth in claim 4, wherein said second solenoid valve includes a sleeve disposed within the hole in the body and a movable plunger disposed in the case.

6. A hydraulic brake pressure control system for an automotive vehicle as set forth in claim 5, wherein said movable plunger includes a projecting end portion that is positioned within the sleeve, said projecting end portion being provided with a valve body.

7. A hydraulic brake pressure control system for an automotive vehicle as set forth in claim 6, including a valve seat located within the sleeve, said valve body being engageable with and disengageable from the valve seat.

8. A hydraulic brake pressure control system for an automotive vehicle comprising:

a wheel brake cylinder for being connected to a road wheel for applying a braking force;

a master cylinder for supplying hydraulic brake pressure;

a hydraulic connecting line communicating said master cylinder and said wheel brake cylinder;

a first solenoid valve disposed in said hydraulic connecting line for selectively closing said connecting line;

a reservoir for holding brake fluid;

a reservoir circuit in communication with the reservoir;

a pressure responsive second solenoid valve connected to the connecting line and the reservoir circuit for selectively communicating a portion of said connecting line between said first solenoid valve and said wheel brake cylinder with said reservoir circuit, said second solenoid valve providing communication between said portion of said connecting line and said reservoir when a pressure differential exists between the pressure in the connecting line and the pressure in the reservoir circuit; and a pump in communication with the reservoir for returning brake fluid in said reservoir to a portion of said connecting line between said master cylinder and said first solenoid valve.

9. A hydraulic brake pressure control system for an automotive vehicle as set forth in claim 8, wherein said first solenoid valve includes a spring for maintaining the first solenoid valve in an open position, said second solenoid valve being devoid of a spring.

10. A hydraulic brake pressure control system for an automotive vehicle as set forth in claim 8, wherein said second solenoid valve includes a movable plunger, a sleeve and a fluid path disposed between said connecting line and said reservoir circuit.

11. A hydraulic brake pressure control system for an automotive vehicle as set forth in claim 8, wherein said second solenoid valve includes a body provided with a hole that commnunicates with the reservoir circuit, a case fitted within the hole and a chamber defined within the case, said chamber being in communication with the connecting line.

12. A hydraulic brake pressure control system for an automotive vehicle as set forth in claim 11, wherein said second solenoid valve includes a sleeve disposed within the hole in the body and a movable plunger disposed in the case.

13. A hydraulic brake pressure control system for an automotive vehicle as set forth in claim 12, wherein said movable plunger includes a projecting end portion that is positioned within the sleeve, said projecting end portion being provided with a valve body.

14. A hydraulic brake pressure control system for an automotive vehicle as set forth in claim 13, including a valve seat located within the sleeve, said valve body being engageable with and disengageable from the valve seat.

* * * * *

UNITED STATES PATENT AND TRADEMARK OFFICE
CERTIFICATE OF CORRECTION

PATENT NO. : 5,975,655
DATED : November 2, 1999
INVENTOR(S) : Hiroshi TODA

It is certified that error appears in the above-identified patent and that said Letters Patent is hereby corrected as shown below:

On the Title Page:
The following information is added:

[30] Foreign Application Priority Data

June 6, 1996 [JP] Japan.......................... 8-144307
May 29, 1997 [JP] Japan.......................... 9-140577

Signed and Sealed this

Twenty-seventh Day of March, 2001

Attest:

NICHOLAS P. GODICI

*Attesting Officer*    Acting Director of the United States Patent and Trademark Office